United States Patent
Vossberg

[11] 3,724,952
[45] Apr. 3, 1973

[54] METHOD FOR POLARIMETRIC ANALYSIS

[76] Inventor: Carl A. Vossberg, P.O. Box 6, Umatilla, Fla. 32784

[22] Filed: June 14, 1971

[21] Appl. No.: 152,729

[52] U.S. Cl. ................356/114, 356/116, 356/201, 250/225
[51] Int. Cl. ............................................G01n 21/40
[58] Field of Search......................356/114–118, 201; 250/225

[56] References Cited

UNITED STATES PATENTS 2,861,493  11/1958  Landegren ...........................356/116
3,345,907  10/1967  Wada ...................................356/116

FOREIGN PATENTS OR APPLICATIONS 753,840  3/1967  Canada ................................356/116
903,988  8/1962  Great Britain.......................356/116

Primary Examiner—Ronald L. Wibert
Assistant Examiner—J. Rothenberg
Attorney—Kemon, Palmer & Estabrook

[57] ABSTRACT

An apparatus and method for determining physical properties and/or composition of a test specimen by passing a beam of polarized radiation therethrough and measuring the effects of the specimen on the beam. The effects measured are rotation of the polarization of the beam, absorption of the beam, and depolarization of the beam, all of which can be measured separately or simultaneously.

13 Claims, 5 Drawing Figures

METHOD FOR POLARIMETRIC ANALYSIS

BACKGROUND OF THE INVENTION

It is known that there are many chemicals and compositions, for example, which have optical properties which produce varying effects on a beam of polarized light passed through, for example, a fluid suspension of the chemical or composition in question. Some things tend to depolarize the beam of light and also increase the absorption while others can rotate polarized light. The present invention is based upon the discovery that there is a quantitative relationship between the optical effect which certain materials have on a rotating polarized beam of light passed therethrough and their physical properties and/or chemical composition.

BRIEF SUMMARY OF THE INVENTION

In accordance with the present invention, a rotating polarized beam of light is passed through a test specimen and then through an analyzer which may be a simple polarizing filter. The radiation emerging from the analyzer is detected by means of any suitable radiation detector and the resulting electrical signal is electrically converted into signals which are proportional to the rotation of polarization, the amount of depolarization and the absorption of the polarized beam transmitted through the specimen. While the description which follows is directed to light as the radiation source, it will be apparent that other forms of radiation could be used with equal effectiveness.

DETAILED DESCRIPTION OF THE INVENTION WITH REFERENCE TO THE DRAWINGS

Figure 1:
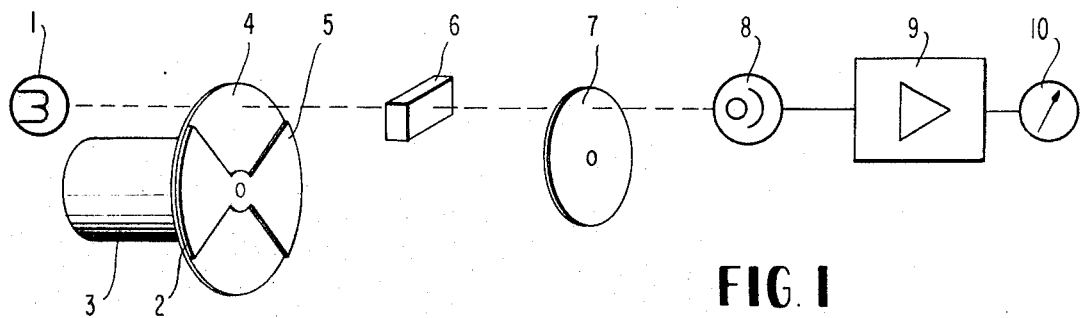
FIG. 1 is a diagrammatic sketch of a preferred embodiment of the present invention.

Referring first to the diagrammatic showing of FIG. 1, an optical test path indicated by the dashed line originates with a source of radiation 1. The source may be a suitably energized incandescent lamp although a monochromatic light would be advantageous in particular applications.

The next item in the optical path is a scanner 2 mounted on the shaft of a motor 3 for rotation therewith. The scanner 2 includes a circular disc of polarizing filter material 4 and superimposed thereon a pair of oppositely disposed 90° pie-shaped segments 5 of material which is opaque to the radiation from the source 1. With this arrangement it will be obvious that when the motor is energized, the beam from the source 1 is alternately blocked and transmitted through the polarizing filter in substantially equal 90° increments of rotation of the scanner 2.

It is this scanned beam which is transmitted through a test specimen indicated in this figure by the reference numeral 6. Positioned on the opposite side of the specimen 6 is an analyzer 7 which may be merely another polarizing filter substantially the same as the filter 4. The analyzer 7 is stationary during operation of the device, but is adjustably rotatably mounted on its own axis for reasons which will appear hereinafter.

Where the specimen under test is a liquid or fluid suspension, it may be housed in a transparent container such as glass or the like. The beam after passing through the scanner 2, the specimen 6 and the analyzer 7 is then detected by any convenient means such, for example, as a photocell 8, the output of which is amplified and/or otherwise manipulated by circuitry which will be described hereinafter and indicated in FIG. 1 with the block identified by the reference numeral 9. The output of the circuitry 9 is then fed to any convenient type of indicator shown in FIG. 1 as a simple current meter 10.

It will be readily appreciated that only the essential elements of the optical path are illustrated in FIG. 1 for reasons of clarity. For greater efficiency, appropriate lenses, filters and apertures may also be placed at various locations along the optical path.

Figure 2:
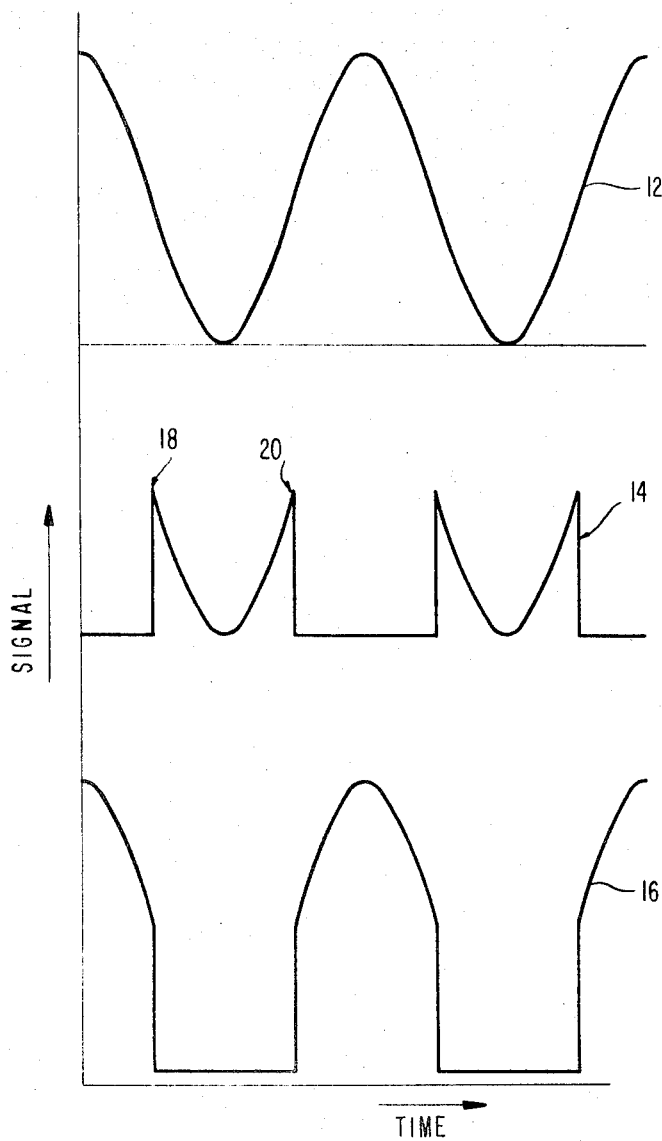
FIGS. 2, 3 and 4 are wave forms appearing at the output of the radiation detector of FIG. 1 under various conditions of operation.

Referring now to FIG. 2 for an initial explanation of the operation of the device diagrammed in FIG. 1, this figure shows wave forms present, for example, at the output of the photocell 8 under various conditions. The sinusoid 12 at the top of FIG. 2 would appear at the output of the photocell 8 if the opaque portions 5 of the scanner 2 were removed from the shaft of the motor 3 and the filter 4 rotated while holding the analyzer 7 stationary and in the absence of a test specimen in the path of the beam. Under these conditions, obviously the radiation on the "downstream" side of the analyzer 7 would go through a periodic variation such as shown in the curve 12, thus resulting in an output from the photocell 8 corresponding to these light variations.

Figure 3:
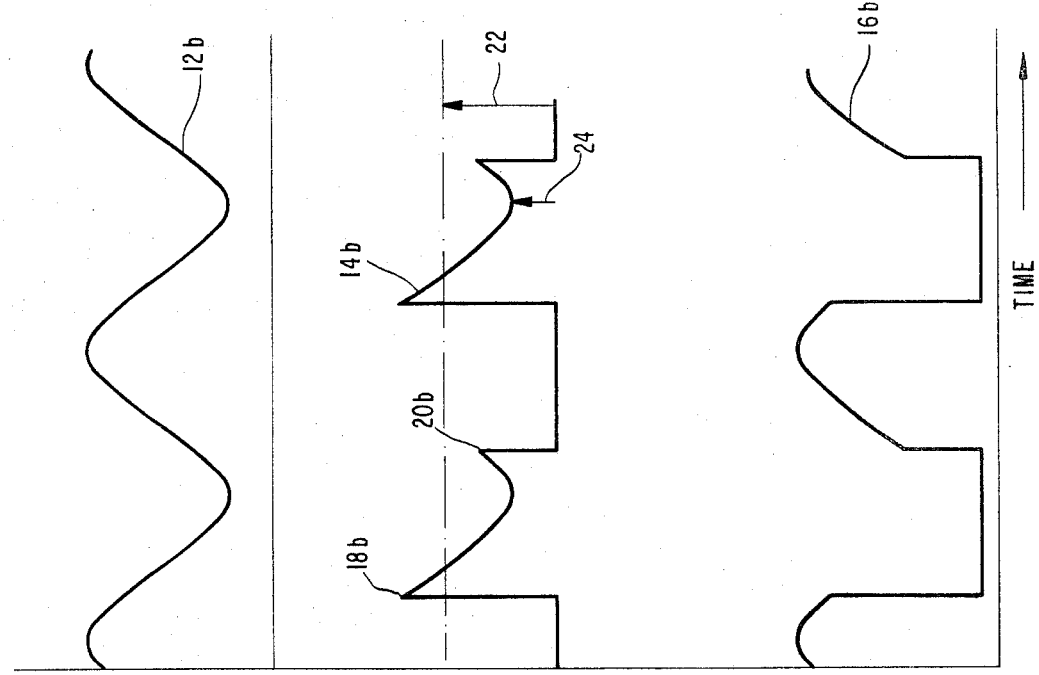

In the wave form indicated at 14 in FIG. 2, the opaque portions of the scanner have been superimposed on the polarizing filter 4 and the phase relationship between the scanner 2 and the analyzer 7 adjusted to a point where the scanner blocks the optical path to the analyzer during maximum peaks of the cycle shown at 12. The curve 16 in FIG. 2 corresponds to the curve 14, but with the analyzer having been rotated 90° from its position corresponding to the curve 14. FIG. 3 shows three curves similar to those in FIG. 2 but with an optically active test specimen positioned in the optical path at 6 in FIG. 1. In this instance, the specimen is such as will rotate the plane of polarization of the linearly polarized beam. One example of such a specimen would be a sugar solution. Since the specimen causes a rotation of the beam, each of the signals corresponding to the wave shapes 12, 14 and 16 of FIG. 2 will be shifted in phase so that they appear as curves 12a, 14a and 16a in FIG. 3.

By measuring the degree of phase shift, the optical activity of the specimen can be determined and appropriate circuitry for achieving this result will be disclosed hereinafter. Suffice to say at this point, the two peaks 18 and 20 which immediately follow and immediately precede the blanking period are equal in curve 14 of FIG. 2 whereas the corresponding peaks 18a and 20a of the curve 14a are of materially different value, the magnitude of the difference being a function of the optical property of the test specimen producing the phase shift resulting in the difference in amplitude of these two peaks. Corresponding differences between curve 16 of FIG. 2 and curve 16a of FIG. 3 will be apparent.

Some materials exhibit optical effects other than rotation of polarization and two such effects would be depolarization and absorption, either one or both of which could occur simultaneously with the rotational polarization shift. One example of such material would be citrus juices and another would be paper pulp with certain fillers suspended in the pulp water. Beer causes a rotational shift and also absorption because of color.

Figure 4:
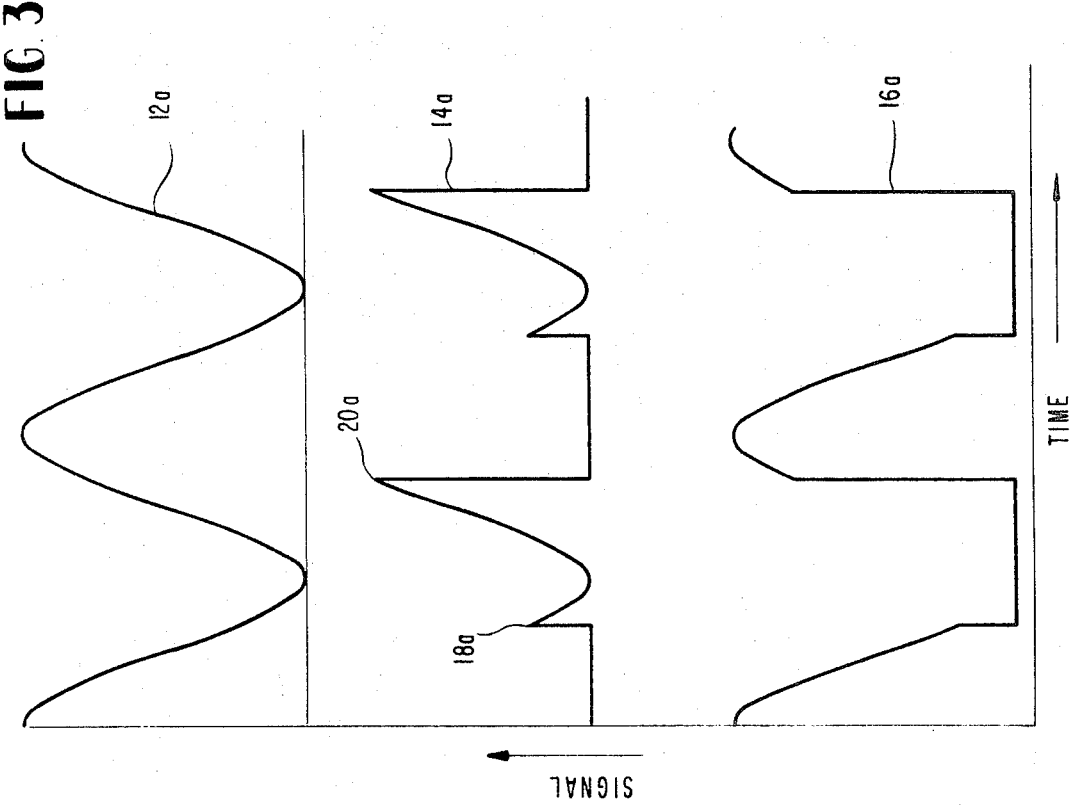

The curves 12b, 14b, and 16b of FIG. 4 correspond to those of the previous two figures but in this instance represent the detector output when a specimen placed in the optical path results in not only a rotation of polarization (now in the opposite direction), but also absorption of the polarized beam and depolarization of the polarized beam. Under these conditions the signal is less due to absorption and the minimum signal is not zero because of incomplete cross polarization due to depolarization. The maximum signal is also less. If one wishes to measure all three optical properties of the test specimen, the curve 12b is not particularly useful but the curve 14b as well as the curve 16b lend themselves admirably to these desired measurements. Considering, for example, curve 14b, the relative peaks 18b and 20b are related to the rotation of polarization, the signal value 22 is midway between peaks 20b and 18b and is a function of the absorption characteristic of the test specimen, and the amplitude of the signal at 24 relative to the average value indicated at 22 is proportional to the depolarization characteristic of the test specimen.

Figure 5:
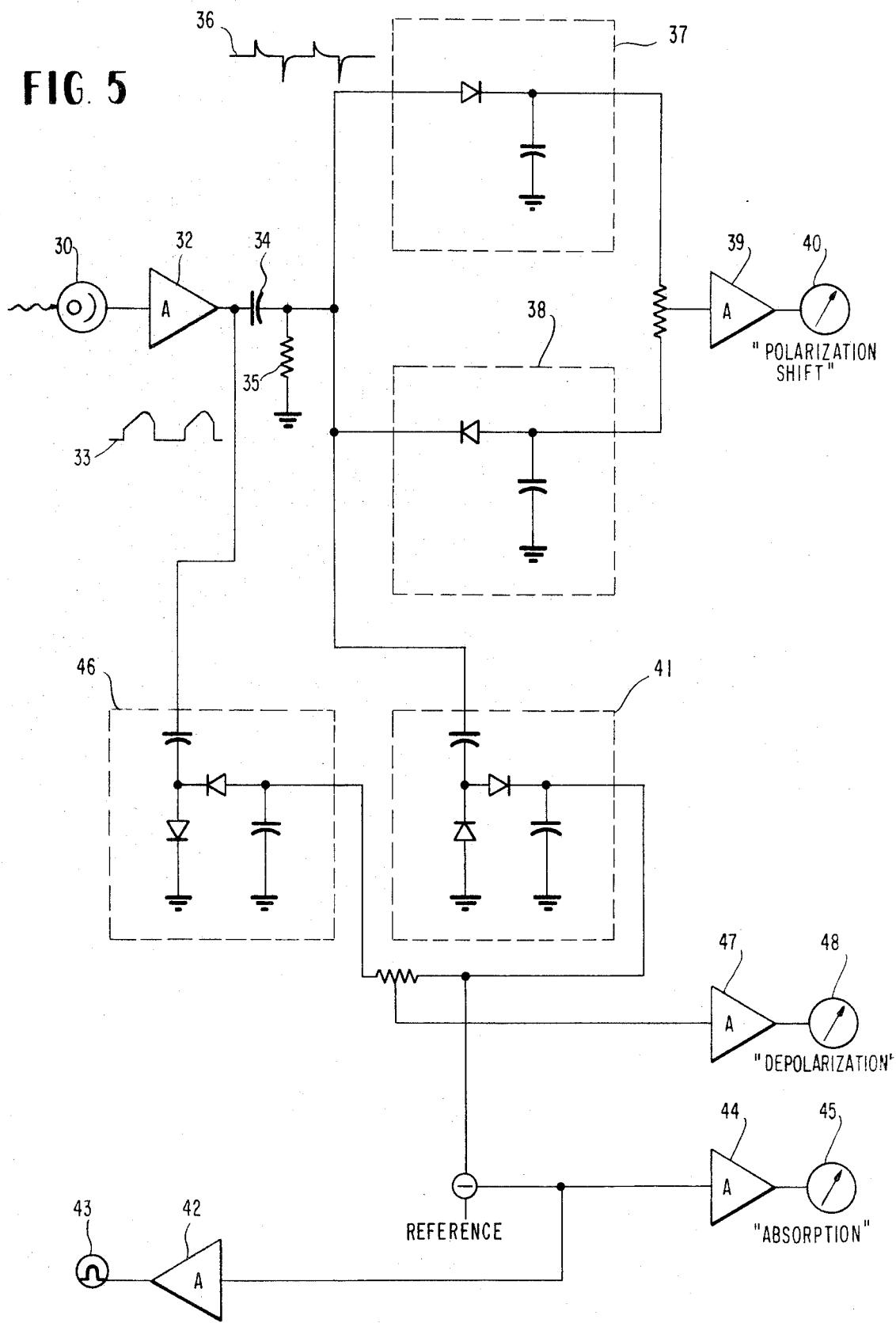
FIG. 5 is a schematic wiring diagram of a preferred embodiment of the measuring and indicating portion of the apparatus of the present invention.

FIG. 5 shows a schematic wiring diagram of a circuit which will yield simultaneous indication of the polarization shift, the depolarization and the absorption characteristics of the test specimen. The circuit here begins with the radiation detector 30 which corresponds to the photocell 8 of FIG. 1. The output of the detector is first amplified at 32 and the output of the amplifier shown at 33 corresponds to the wave form of FIG. 4 at 16b. This signal is first fed to a network consisting of a capacitor 34 and resistor 35, the time constant of which is low compared to the signal period and the network therefore acts as a quasi-differentiator having an output as indicated at 36. The sharp positive and negative peaks relate to the above changes in the signal at the output of the amplifier. If the phase is such that the signal peaks both positive and negative are equal to each other, the indication would be that the test specimen does not effect any rotation of polarization. If, however, the specimen is such to cause a rotation, then there will be a shift in phase and a corresponding difference between the absolute values of positive and negative peaks of the curve 36. The difference between these peaks is a function of the magnitude of the phase shift involved. By feeding this signal through a pair of peak detector circuits 37 and 38, one detecting the positive and the other the negative peaks, and then combining and comparing the output of the two detector circuits so as to arrive at an algebraic sum of the two, the resulting signal can be amplified as, for example, at 39 and the sum indicated on an indicator 40. The indicator 40 is shown as a simple current meter but obviously it could be a digital readout, a recorder, or any other form of indicating instrument.

It will be further apparent that because of completely blanking the light beam at intervals, a particularly simple form of circuit is available to achieve the desired results. Another advantage is that the readings will be uneffected by such factors as ambient light, signal levels, phototube detector dark current, and the like. It is also possible to regulate the desired signal amplitude as will be described hereinafter.

The differentiated signal 36 may also be peak-to-peak detected by the detector circuit 41. The output of this circuit is compared with a reference voltage and the error amplified by the amplifier 42 to control the lamp 43 which corresponds to the radiation source 1 of FIG. 1. Alternatively, the output of the peak-to-peak detector could be used to control the amplification of amplifier 32 in order to maintain the output pulses at a constant and predetermined level. For example, if the specimen becomes more turbid, the circuit will automatically increase the supply to the lamp to offset the absorption. The control signal is a measure of absorption and is therefore also coupled to an amplifier 44 to drive an indicator 45. Color changes in the test specimen can be similarly measured.

The signal at the output of the amplifier 32 is also detected by a peak-to-peak detector 46 having a negative output and compared with the output from the positive peak-to-peak detector 41. The net signal from these two is then amplified at 47 and fed to indicator 48 to yield a reading corresponding to the depolarization property of the test specimen. This is so because the peak-to-peak value of the signal at the output of amplifier 32 is a measure of polarization. For example, for the case of complete polarization, the peak-to-peak value of this signal should be equal to the peak-to-peak value of the signal shown at 36 which is the output of the differentiating network 34 and 35 provided allowance is made for circuit parameter adjustments. In the extreme case of no polarization (corresponding to complete depolarization), the signal at the output of amplifier 32 would appear flat-topped and the output from 46 would be one-half of that from 41 and this information could be indicated and calibrated on 48.

An alternative method for determining the optical rotation after passing through the specimen is to null the signal from amplifier 39 by means of a servo mechanism rotating analyzer 7. The angular rotation of the analyzer to maintain this null is directly related to the optical rotation and appropriate readout can be connected to the analyzer.

A further modification, useful for the case where the specimen causes considerable depolarization is to connect the input of amplifier 42 and its reference comparator to a suitable divider similar to 49. Then as depolarization increases, the relative output of 46 will tend to become less than that of 41 causing amplifier 42 to increase the lamp drive which will maintain constant gain from 37/38.

In conjunction with a refractometer such as disclosed in my prior U. S. Pat. No. 2,807,976, more complex combination of constituents and their effects can be separated and indicated individually with cross effects computed out. Thus in beer the sugar content can be distinguished from the alcohol since alcohol is optically inactive but does affect the refractive index and color can be measured simultaneously. Only one optical channel is used and the overall gain precisely regulated.

From the foregoing it will be apparent to those skilled in this art that there is herein shown and disclosed a new and useful analytical instrument. While preferred embodiments in simplified form have been disclosed, applicant claims the benefit of a full range of equivalents within the scope of the appended claims.

I claim:

1. Apparatus for determining the physical properties and/or compositions of a test specimen comprising:
   means for subjecting a test specimen to the passage therethrough of a periodically interrupted, linearly polarized beam of radiation the plane of polarization of which is continuously rotated;
   a polarizing filter analyzer positioned in the path of the beam downstream of the test specimen;
   and means for detecting the beam downstream of said analyzer to yield a measure of the optical effect of the specimen on the beam.

2. Apparatus for determining physical properties and/or compositions of a test specimen by passing a beam of polarized radiation through said specimen and measuring the optical effects of said specimen on said beam comprising:
   A. a radiation path which includes the following elements spaced from each other and in the order named
      a. a source of radiation;
      b. means for polarizing the radiation from said source, for continuously rotating the polarization and for periodically blocking said path;
      c. an analyzer comprising a polarizing filter;
      d. a radiation detector; and
   B. means for locating a test specimen in said optical path between said polarizing means and said analyzer.

3. Apparatus as defined by claim 2 in which said path is periodically blocked between said source and the test specimen.

4. Apparatus as defined by claim 3 in which said blocking means operates in synchronism with said means for rotating the polarization.

5. Apparatus as defined by claim 4 including means for measuring the degree of rotation of polarization of the beam due to passage through the test specimen.

6. Apparatus as defined by claim 4 including means for measuring the amount of depolarization of the beam of radiation by the test specimen.

7. Apparatus as defined by claim 4 including means for measuring the amount of absorption of the beam of radiation by the test specimen.

8. Apparatus as defined by claim 4 including means for simultaneously measuring rotation of polarization, depolarization and absorption of radiation of the beam by the test specimen.

9. A method of determining physical properties and/or compositions of a test specimen, the steps comprising:
   a. passing a periodically interrupted, linearly polarized beam of radiation the plane of polarization of which is continuously rotated through the test specimen and then through a polarizing filter analyzer; and
   b. detecting the radiation downstream of the analyzer to yield a measure of the optical effects of the specimen on the beam.

10. The method defined by claim 9 including the step of measuring the degree of rotation of the plane of polarization of the beam due to passage through the test specimen.

11. The method defined by claim 9 including the step of measuring the amount of absorption of the beam by the test specimen.

12. The method of claim 9 including the step of measuring the depolarization of the beam due to passage through the test specimen.

13. The method of claim 9 including the following steps simultaneously performed:
   a. the step of measuring the degree of rotation of the beam due to passage through the test specimen;
   b. the step of measuring the amount of absorption of the beam by the test specimen; and
   c. the step of measuring the depolarization of the beam due to passage through the test specimen.

* * * * *